United States Patent [19]

Akimune

[11] Patent Number: 5,122,485
[45] Date of Patent: Jun. 16, 1992

[54] SINTERED SILICON CARBIDE AND SILICON NITRIDE BASE COMPOSITE

[75] Inventor: Yoshio Akimune, Kanagawa, Japan

[73] Assignee: Nissan Motor Co., Ltd., Japan

[21] Appl. No.: 644,653

[22] Filed: Jan. 23, 1991

[30] Foreign Application Priority Data

Jan. 29, 1990 [JP] Japan .................................. 2-20309

[51] Int. Cl.⁵ ........................ C04B 35/56; C04B 35/58
[52] U.S. Cl. ........................................ 501/92; 501/97; 501/98; 264/66
[58] Field of Search ............... 501/92, 97, 98; 264/65, 264/66

[56] References Cited

U.S. PATENT DOCUMENTS

| | | | |
|---|---|---|---|
| 4,184,882 | 1/1980 | Lange | 501/92 |
| 4,560,668 | 12/1985 | Hunold et al. | 501/92 |
| 4,800,182 | 1/1989 | Izaki et al. | 501/97 X |
| 4,820,663 | 4/1989 | Mehrotra et al. | 501/92 X |
| 4,826,791 | 5/1989 | Mehrotra et al. | 501/92 X |
| 4,888,310 | 12/1989 | Richon et al. | 501/92 |
| 4,920,085 | 4/1990 | Yoshida et al. | 501/97 |

FOREIGN PATENT DOCUMENTS

| | | | |
|---|---|---|---|
| 3504393 | 8/1985 | Fed. Rep. of Germany | 501/92 |
| 58-91070 | 5/1983 | Japan . | |
| 60-46973 | 3/1985 | Japan . | |
| 61-36176 | 2/1986 | Japan . | |
| 1-275470 | 1/1989 | Japan . | |
| 64-9872 | 11/1989 | Japan . | |

OTHER PUBLICATIONS

Shimada et al. "Sintering of $Si_3N_4$—SiC Composite powders" Rep. Asahi Glass found, Ind. Technol., 49 (1986), pp. 103-109

Wotting et al. "Influence of Powder Properties and Processing Conditions on Microstructure and Mechanical Properties of Sintered $Si_3N_4$", Ceramics Intern. vol. 10, No. 1 (1984), pp. 18-22.

F. F. Lange, "Effect of Microstructure on Strength of $Si_3N_4$—SiC Composite System" Journal of American Ceramic Society, vol. 56, No. 9, pp. 445-449.

C. Greskovich et al, "Observations on the fracture Toughness of B—$Si_3N_4$—B—SiC Composites" Journal of American Ceramic Society, vol. 63, No. 9-10, pp. 597-599.

*Primary Examiner*—Karl Group
*Attorney, Agent, or Firm*—Lowe, Price, LeBlanc & Becker

[57] ABSTRACT

A method for producing a sintered silicon carbide and silicon nitride base composite which is suitable for a material for automotive engine parts. The method is comprised of compacting a mixture including, as major components, powder of $\beta$-type silicon carbide and powder of $\alpha$-type silicon nitride to form a compact. The compact is first sintered at ordinary pressure, and then resintered at a pressure of nitrogen gas ranging from 10 to 2000 atmosphere and at a temperature higher 100° to 200° C. than that in the ordinary pressure sintering, thereby obtaining the sintered composite high in strength and toughness.

8 Claims, 2 Drawing Sheets

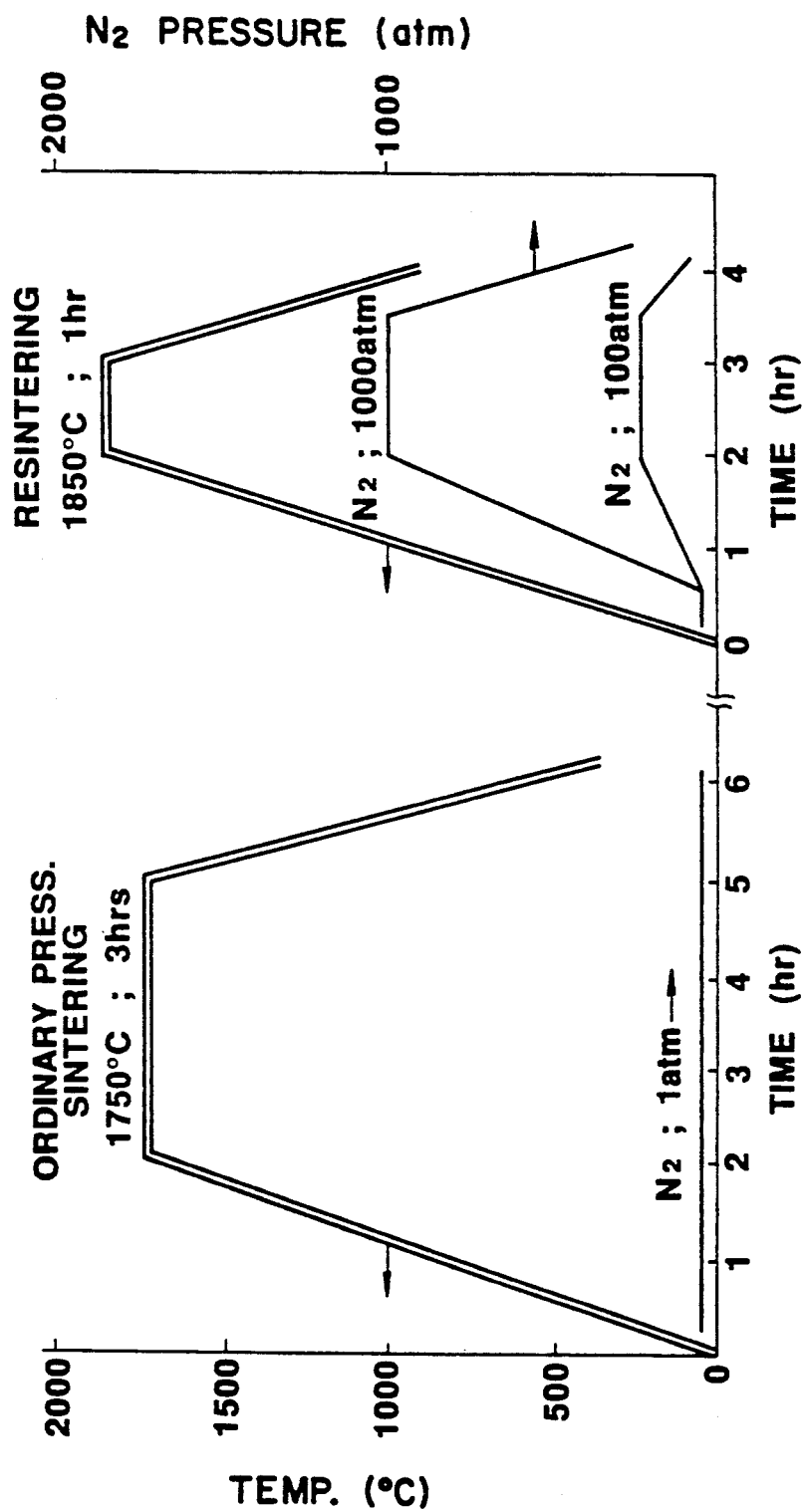

5,122,485

SINTERED SILICON CARBIDE AND SILICON NITRIDE BASE COMPOSITE

BACKGROUND OF THE INVENTION

1. Field of the Invention

This invention relates to improvements in a method for producing a sintered silicon carbide and silicon nitride base composite which is used as a material for mechanical parts (such as automotive engine parts) requiring a high strength in a high temperature, a high heat resistance and a high corrosion resistance.

2. Description of the Prior Art

A variety of methods for producing a sintered silicon carbide (SiC) and silicon nitride ($Si_3N_4$) base composite have been proposed. One of them is disclosed in Japanese Patent Provisional Publication No. 61-36176, in which the sintered composite includes 10 to 72% by volume of SiC, 5 to 65% by volume of $Si_3N_4$ and 5 to 40% by volume of Si. Another one is disclosed in Japanese Patent Provisional Publication 60-46973, in which the sintered composite includes SiC and $Si_3N_4$ as major components and 0.05 to 50% by weight of rare earth element oxide. A further method is disclosed in Japanese Patent Provisional Publication No. 58-91070, in which the sintered composite is produced by mixing and sintering metals in group II, III and IV of a periodic table of the elements and oxide and/or carbide thereof with mixture powder of SiC and $Si_3N_4$.

Additionally, the mechanical characteristics of a sintered silicon carbide and silicon nitride base composite is discussed in Journal of American Ceramic Society 56 (9) 445 (1973) and in the same 63 (9-10) 597 (1980).

Furthermore, Japanese Patent Provisional Publication No. 1-275470 discloses a sintered silicon carbide and silicon nitride base composite which is produced by hot-pressing mixture powder of silicon carbide and silicon nitride which is formed from organic silicon compounds under a gas phase method. Japanese Patent Provisional Publication No. 64-9872 discloses a sintered silicon carbide and silicon nitride base composite produced by an ordinary pressure sintering, in which silicon nitride is in needle form and of β-phase, while silicon carbide is of single crystal and has a particle size of 2 to 30 μm.

However, in many of such conventional methods of producing the sintered silicon carbide and silicon nitride base composite, it is necessary to employ hot pressing to promote formation of fine and dense structure of the sintered composite during sintering. Accordingly, it is difficult to produce mechanical parts having a complicated shape. Additionally, in the last-described sintered composite producing method in connection with the Publication No. 64-9872, the ordinary pressure sintering is employed and therefore the strength of the resultant sintered composite is not so improved while being high in toughness, making possible to produce mechanical parts of a complicated shape.

SUMMARY OF THE INVENTION

It is an object of the present invention to provide an improved method of producing a sintered silicon carbide and silicon nitride base composite, which makes possible to obtain ceramic mechanical parts which have a complicated shape and are high in mechanical strengths.

Another object of the present invention is to provide an improved method for producing a sintered silicon carbide and silicon nitride base composite, which makes possible to produce ceramic mechanical parts high in mechanical strengths as compared with that produced by the ordinary pressure sintering, omitting a hot pressing thereby obtaining the ceramic mechanical parts of a complicated shape.

A production method of the present invention is for a sintered silicon carbide and silicon nitride base composite and is comprised of the following steps in the sequence set forth: sintering a mixture including, as major components, powder of β-type silicon carbide and powder of α-type silicon nitride at an ordinary pressure and a first predetermined temperature; and resintering the sintered mixture at a partial pressure of nitrogen gas ranging from 10 to 2000 atmosphere and at a second predetermined temperature higher 100° to 200° C. than the first predetermined temperature.

By virtue of the resintering following the ordinary sintering, it is made possible to produce ceramic mechanical parts having a complicated shape because of omitting a hot pressing, and is excellent in mechanical strengths particularly in impact resistance.

BRIEF DESCRIPTION OF THE DRAWINGS

FIG. 2 is a graph showing patterns of ordinary pressure sintering and resintering in terms of sintering temperature and $N_2$ gas partial pressure, employed in Examples of the present invention.

DETAILED DESCRIPTION OF THE INVENTION

According to the present invention, a method for producing a sintered silicon carbide and silicon nitride base composite is comprised of the following steps in the sequence set forth: sintering a mixture including, as major components, powder of β-type silicon carbide and powder of α-type silicon nitride at an ordinary pressure and at a first predetermined temperature; and resintering said sintered mixture at a pressure of nirogen gas ranging from 10 to 2000 atmosphere and at a second temperature higher 100° to 200° C. than the first predetermined temperature.

In order to improve the toughness of a sintered body of which main component is silicon nitride, it has been proposed that mixing other component particles (such as silicon carbide particles) having particle sizes larger than silicon nitride is carried out in which the route of breakage of the sintered body is complicated thereby to improve the toughness of the sintered body. However, in this case, mixing larger particles leads to increasing the size of a breakage source thereby providing a possibility of lowering the strength of the sintered body. Otherwise, in case of mixing component particles which are smaller in particle size than the silicon nitride particles, segregation of the smaller component particles is made in grain boundary so that improvement in fracture toughness and breaking strength is little.

Figure 1:
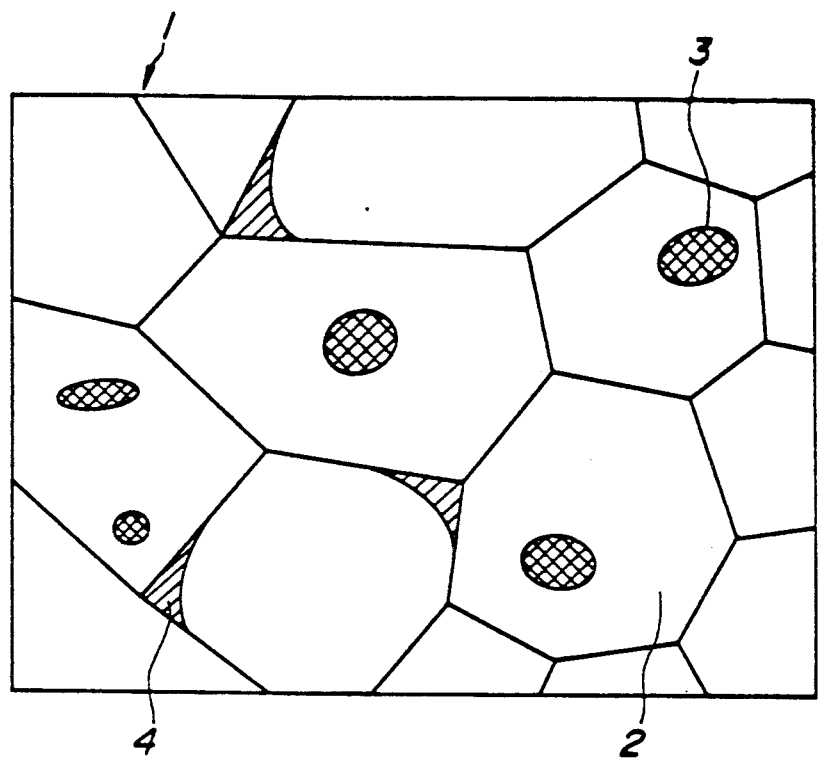
FIG. 1 is a schematic enlarged illustration of the structure of a sintered silicon carbide and silicon nitride base composite produced according to a production method of the present invention.

In view of the above, according to the present invention, a composite or sintered body having segregation of silicon carbide formed in grain boundary is first produced by sintering at ordinary pressure. The thus produced sintered composite is resintered thereby to cause β-type silicon nitride particles to uniformly grow as shown in FIG. 1 which is schematic microscopic illustration of the structure of the sintered silicon carbide and silicon nitride base composite. As seen from FIG. 1, in the structure of the sintered silicon carbide and silicon nitride base composite 1 of the present invention, a grain of β-type silicon carbide 3 is taken and located in a grain of β-type silicon nitride 2 thereby greatly improving the strength and toughness of the sintered body or composite. The reference numeral 4 in FIG. 1 denotes a glass phase at grain boundary.

The resintering carried out after the sintering at ordinary pressure is conducted at a temperature higher 100° to 200° C. than that in the ordinary pressure sintering and at a nitrogen pressure not lower than 10 atmosphere (atm) in order to prevent decomposition of silicon nitride. The nitrogen pressure in the resintering is preferably within a range from 10 to 2000 atmosphere, which has been confirmed by a variety of experiments.

It is preferable that the resultant sintered silicon carbide and silicon nitride base composite contains 5 to 15% by volume of β-silicon carbide, and a balance including β-type silicon nitride and glass phase at grain boundary which glass phase has been produced by addition of suitable sintering assistant(s). Additionally, it is preferable that the powder of β-type silicon carbide used in this production method of the present invention has an average particle size ranging from 0.2 to 0.5 μm.

As appreciated from the above, according to the production method of the present invention, by virtue of the resintering following the ordinary pressure sintering, the growth of the silicon nitride grain as a matrix is caused thereby to provide a structure in which β-silicon carbide grain is taken and located in the β-silicon nitride. Accordingly the sintered body having such a structure has a high strength and a low hardness and therefore tends to absorb impact thereby to be higher in toughness for the following reasons: Load applied from the outside to the sintered body tends to be effectively absorbed by silicon carbide grain within silicon nitride grain, and a crack is caused around the silicon carbide grain under the effect of a difference in thermal expansion coefficient between silicon carbide and silicon nitride, tending to give rise to plastic deformation of the structure.

In order to evaluate the production method of the sintered silicon carbide and silicon nitride base composite according to the present invention, Examples will be discussed in comparison with Reference Examples and Comparative Examples, referring to Table 1.

EXAMPLE

EXAMPLES 1, 2 and 3

First, base powder was prepared by mixing 85% by weight of α-Si$_3$N$_4$, 10% by weight of Y$_2$O$_3$ as a sintering assistant and 5% by weight of Al$_2$O$_3$. The thus prepared base powder was mixed in amounts of 95, 90 and 85% by volume with β-SiC powder which was in amounts of 5, 10 and 15% by volume and had an average particle size of 0.3 μm, with each other in ethanol by using a ball mill thereby to obtain three kinds of mixture powders. After drying, each of the mixture powders was compacted by a so-called cold isostatic pressing at a compression pressure of 4 ton thereby to obtain three kinds of compacts. Each of the compacts was subjected to an ordinary pressure sintering at a temperature of 1750° C. for a time of 3 hours, in the atmosphere of N$_2$ gas at a pressure of 1 atmosphere (atm). Then, the sintered compact was subjected to a resintering at a temperature of 1850° C. for a time of 1 hour, in the atmosphere of N$_2$ gas at a pressure of 1000 atmosphere thereby obtaining three kinds of sintered silicon carbide and silicon nitride base composites. The variations of the temperature and the atmosphere pressure in the above-mentioned ordinary pressure sintering and the resintering were shown in the graph of FIG. 2.

Next, a variety of tests were conducted on the resultant sintered composites to get characteristic values of them. First, the density of each of the sintered composites was measured. The result is shown in Table 1 from which it was conformed that the sintered composites of Examples 1, 2 and 3 respectively had a high density ranging from 3.29 to 3.31 g/cm$^3$. Additionally, the crystal phase of each of the obtained sintered composites was examined. As a result, it was confirmed that each sintered composite contained β-SiC and β-Si$_3$N$_4$ as main components or a base. Furthermore, each of the sintered composites was subjected to tests to measure a flexural strength (σf), a fracturel toughness (Kic), a hardness (Hv) and an impact resistance (Vc). The results of these tests are shown in Table 1.

Figure 3:
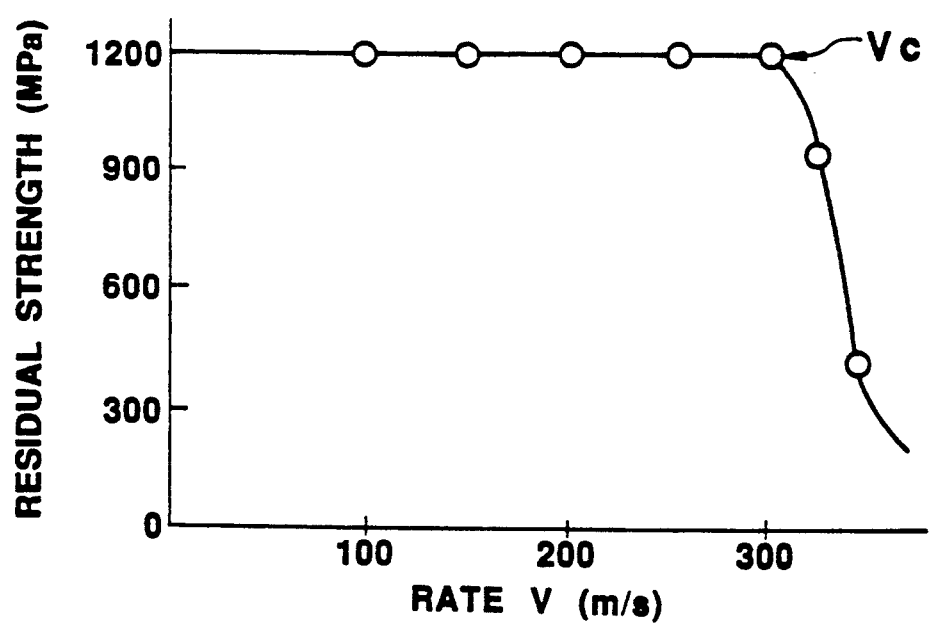
FIG. 3 is a graph showing a condition in which an impact resistance of the sintered composite was measured.

The flexural strength (σf) was measured by a so-called four point bending test according to Japanese Industrial Standard R1601. The fracture toughness (Kic) was measured by a so-called indentation method. The hardness was measured by using a Vickers hardness tester. The impact resistance was measured as follows: A zirconia bead having a diameter of 1.0 mm was driven in a specimen of the sintered composite, in which a rate (Vc) of giving rise to a strength lowering was determined as shown in FIG. 3. The impact resistance (Vc) is preferably about 300 m/s for the material of a structural part which requires relatively strict characteristics.

As shown in Table 1, it was confirmed that the three kinds of the sintered composites were good in all the flexible strength (σf), fracture thoughness (Kic), hardness (Hv) and impact resistance (Vc). Thus, the sintered composites of Examples 1 to 3 were improved in strength and impact resistance under the effect of a high fracture toughness value and the effect of the silicon carbide grain in the silicon nitride absorbing load applied to them.

REFERENCE EXAMPLES 1 and 2

Sintered composites of Reference Examples 1 and 2 were produced by a similar method (including the ordinary pressure sintering and the resintering) to that in Examples 1, 2 and 3 with the exception that the base powder was mixed in amounts of 97% and 80% by volume with the β-SiC powder in amounts of 3 and 20% by volume, so that the resultant sintered composites contained β-SiC phase and β-Si$_3$N$_4$ phase. Thereafter, the same tests as those in Examples 1, 2 and 3 were conducted to get the characteristic values of each sintered composite. The test results are shown in Table 1.

As seen from Table 1, in case of the Reference Example 1 which was less in the content of β-SiC, the advantageous effect of β-SiC was not be able to be exhibited and therefore the flexural strength, fracture toughness and impact resistance of each sintered composite were all inferior as compared with those in Examples 1, 2 and 3. In case of the Reference Example 2 which was more in the content of β-SiC, the impact resistance was inferior while the flexural strength and the fracture toughness were good. As a result, it was confirmed to be preferable that the resultant sintered composite contained 5 to 15% by volume of β-SiC.

COMPARATIVE EXAMPLES 1 and 2

First, a base powder was prepared by mixing 85% by weight of $Si_3N_4$, 10% by weight of $Y_2O_3$ as a sintering assistant and 5% by weight of $Al_2O_3$. The base powder was mixed in an amount of 90% by volume with -SiC powder which was in an amount of 10% by volume and had an average particle size of 0.3 um to form a mixture powder. Each of the base powder only (in Comparative Example 1) and the mixture powder (in Comparative Example 2) was subjected to mixing in ethanol by using a ball mill. After drying, the thus prepared well mixed powder was compacted by the cold isostatic pressing thereby to form a compact. The compact was subjected to an ordinary pressure sintering at a temperature of 1750° C. for a time of 3 hours, in the atmosphere of $N_2$ gas at a pressure of 1 atmosphere (atm) thereby to form a sintered body.

A variety of the tests were conducted on the thus obtained sintered bodies to get the characteristic values of each sintered body of Comparative Example 1 or 2, in the same manner as that in Examples 1, 2 and 3. The test results are shown in Table 1. As seen from Table 1, it was confirmed that only the ordinary sintering results in a sintered body which is high in hardness but fragile.

COMPARATIVE EXAMPLES 3 and 4

First, base powder was prepared by mixing 85% by weight of $\alpha$-$Si_3N_4$, 10% by weight of $Y_2O_3$ as a sintering assistant and 5% by weight of $Al_2O_3$. The base powder was mixed in an amount of 90% by volume with β-SiC powder which was in an amount of 10% by volume and had an average particle size of 0.3 um to form a mixture powder. Each of the base powder only (in Comparative Example 3) and the mixture powder (in Comparative Example 4) was subjected to mixing in ethanol by using a ball mill. After drying, the thus prepared well mixed powder was compacted by the cold isostatic pressing thereby to form a compact. The compact was subjected to a heat pressing at a temperature of 1720° to 1740° C. for a time of 30 minutes, in the atmosphere of $N_2$ gas at a pressure of 1 atmosphere (atm) thereby to form a sintered body.

A variety of tests were conducted on the thus obtained sintered bodies to get the characteristic values of each sintered body of Comparative Example 3 or 5, in the same manner as that in Examples 1, 2 and 3. The test results are shown in Table 1. As seen from Table 1, it was confirmed that only the hot pressing results in a sintered body which is high in hardness but fragile.

COMPARATIVE EXAMPLES 5, 6 and 7

Sintered composites of Comparative Examples 5, 6 and 7 were produced by a similar method to that in Example 2 with the exception that the pressure of $N_2$ gas atmosphere in the resintering was 10 atmosphere in Comparative Example 5 and 100 atmosphere in Comparative Example 6; and the temperature in the resintering was 1750° C. (which was the same as the temperature in the ordinary pressure sintering in Example 2) in Comparative Examples 5, 6 and 7.

Next, the same tests as those in Example 2 were conducted on the thus obtained sintered composites in order to get the characteristic values of them. The test results are shown in Table 1 and demonstrates that the resultant sintered composites were inferior in impact resistance characteristics while being relatively high in hardness, in case that the resintering temperature is the same as the ordinary pressure sintering temperature.

EXAMPLES 4, 5, 6 and 7

Sintered composites of Examples 4 and 5 were produced by a similar method to that Example 2 with the exception that the pressure of $N_2$ gas in the resintering were lowered as 10 and 100 atmospheres, respectively. A sintered composite of Example 6 was produced by the similar method to that in Example 2 with the exception that the temperature of the resintering was raised as 1950° C. A sintered composite of Example 7 was produced by the similar method to that in Example 2 with the exception that the pressure of $N_2$ gas atmosphere in the resintering was raised as 2000 atmosphere and that the temperature of the resintering was raised as 1950° C.

Next, the similar tests to those in Example 2 were conducted to get the characteristic values of the resultant sintered composites. The test results are shown in Table 1 and demonstrates that the sintered composites were all good in various characteristics.

TABLE 1

|  | Reference Example 1 | Example 1 | Example 2 | Example 3 | Reference Example 2 | Example 4 | Example 5 | Example 6 |
|---|---|---|---|---|---|---|---|---|
| Powder mixture | | | | | | | | |
| α-$Si_3N_4$ (wt %) | 85 | 85 | 85 | 85 | 85 | 85 | 85 | 85 |
| $Y_2O_3$ + $Al_2O_3$ (wt %) | 15 | 15 | 15 | 15 | 15 | 15 | 15 | 15 |
| SiC blended rate (vol %) | 3 | 5 | 10 | 15 | 20 | 10 | 10 | 10 |
| SiC particle size (μm) | 0.3 | 0.3 | 0.3 | 0.3 | 0.3 | 0.3 | 0.3 | 0.3 |
| Ordinary press. sintering | | | | | | | | |
| Condition | Ordinary pressure | Ordinary pressure | Ordinary pressure | Ordinary pressure | Ordinary pressure | Ordinary pressure | Ordinary pressure | Ordinary pressure |
| Atmosphere | $N_2$, 1 atm | $N_2$, 1 atm | $N_2$, 1 atm | $N_2$, 1 atm | $N_2$, 1 atm | $N_2$, 1 atm | $N_2$, 1 atm | $N_2$, 1 atm |
| Temp. (°C.) | 1750 | 1750 | 1750 | 1750 | 1750 | 1750 | 1750 | 1750 |
| Time (Hr) | 3 | 3 | 3 | 3 | 3 | 3 | 3 | 3 |
| Resintering | | | | | | | | |
| Condition | Gas pressure | Gas pressure | Gas pressure | Gas pressure | Gas pressure | Gas pressure | Gas pressure | Gas pressure |
| Atmosphere | $N_2$, 1000 atm | $N_2$, 1000 atm | $N_2$, 1000 atm | $N_2$, 1000 atm | $N_2$, 1000 atm | $N_2$, 10 atm | $N_2$, 100 atm | $N_2$, 1000 atm |
| Temp. (°C.) | 1850 | 1850 | 1850 | 1850 | 1850 | 1850 | 1850 | 1950 |
| Time (Hr) | 1 | 1 | 1 | 1 | 1 | 1 | 1 | 1 |
| Density (g/cm$^3$) | 3.31 | 3.31 | 3.30 | 3.29 | 3.29 | 3.29 | 3.29 | 3.28 |
| Crystal phase | β-SiC | β-SiC | β-SiC | β-SiC | β-SiC | β-SiC | β-SiC | β-SiC |

TABLE 1-continued

|  | $\beta$-Si$_3$N$_4$ | $\beta$-Si$_3$N$_4$ | $\beta$-Si$_3$N$_4$ | $\beta$-Si$_3$N$_4$ | $\beta$-Si$_3$N$_4$ | $\beta$-Si$_3$N$_4$ | $\beta$-Si$_3$N$_4$ | $\beta$-Si$_3$N$_4$ |
|---|---|---|---|---|---|---|---|---|
| Flexural Strength $\sigma$f (MPa) | 820 | 1220 | 1300 | 1280 | 1220 | 1120 | 1210 | 1310 |
| Fracture toughness Kic (MPa$\sqrt{m}$) | 4.8 | 5.7 | 5.4 | 5.5 | 6.0 | 5.4 | 5.5 | 5.4 |
| Hardness Hv (Kgf/mm$^2$) | 1520 | 1500 | 1480 | 1500 | 1600 | 1510 | 1550 | 1520 |
| Impact resistance Vc (m/s) | 220 | 300 | 330 | 310 | 260 | 300 | 310 | 300 |

|  | Example 7 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Powder mixture | | | | | | | | |
| $\alpha$-Si$_3$N$_4$ (wt %) | 85 | 85 | 85 | 85 | 85 | 85 | 85 | 85 |
| Y$_2$O$_3$ – Al$_2$O$_3$ (wt %) | 15 | 15 | 15 | 15 | 15 | 15 | 15 | 15 |
| SiC blended rate (vol %) | 10 | 0 | 10 | 0 | 10 | 10 | 10 | 10 |
| SiC particle size ($\mu$m) | 0.3 | — | 0.3 | — | 0.3 | 0.3 | 0.3 | 0.3 |
| Ordinary press. sintering | | | | | | | | |
| Condition | Ordinary pressure | Ordinary pressure | Ordinary pressure | Hot pressing | Hot pressing | Ordinary pressure | Ordinary pressure | Ordinary pressure |
| Atmosphere | N$_2$, 1 atm | N$_2$, 1 atm | N$_2$, 1 atm | N$_2$, 1 atm | N$_2$, 1 atm | N$_2$, 1 atm | N$_2$, 1 atm | N$_2$, 1 atm |
| Temp. (°C.) | 1750 | 1750 | 1750 | 1720 | 1740 | 1750 | 1750 | 1750 |
| Time (Hr) | 3 | 3 | 3 | 0.5 | 0.5 | 3 | 3 | 3 |
| Resintering | | | | | | | | |
| Condition | Gas pressure | — | — | — | — | Gas pressure | Gas pressure | Gas pressure |
| Atmosphere | N$_2$, 2000 atm | — | — | — | — | N$_2$, 10 atm | N$_2$, 100 atm | N$_2$, 1000 atm |
| Temp (°C.) | 1950 | — | — | — | — | 1750 | 1750 | 1750 |
| Time (Hr) | 1 | — | — | — | — | 1 | 1 | 1 |
| Density (g/cm$^3$) | 3.29 | 3.28 | 3.24 | 3.28 | 3.27 | 3.28 | 3.28 | 3.28 |
| Crystal phase | $\beta$-SiC $\beta$-Si$_3$N$_4$ | $\beta$-Si$_3$N$_4$ | $\beta$-SiC $\beta$-Si$_3$N$_4$ | $\beta$-Si$_3$N$_4$ | $\beta$-SiC $\beta$-Si$_3$N$_4$ | $\beta$-SiC $\beta$-Si$_3$N$_4$ | $\beta$-SiC $\beta$-Si$_3$N$_4$ | $\beta$-SiC $\beta$-Si$_3$N$_4$ |
| Flexural Strength $\sigma$f (MPa) | 1220 | 930 | 780 | 920 | 940 | 980 | 990 | 310 |
| Fracture toughness Kic (MPa$\sqrt{m}$) | 5.2 | 5.7 | 4.6 | 5.4 | 4.8 | 5.8 | 5.9 | 5.8 |
| Hardness Hv (Kgf/mm$^2$) | 1510 | 1710 | 1700 | 1700 | 1750 | 1700 | 1710 | 1650 |
| Impact resistance Vc (m/s) | 300 | 150 | 140 | 150 | 150 | 210 | 230 | 230 |

What is claimed is:

1. A method for producing a sintered silicon carbide and silicon nitride composite, comprising the following steps in the sequence set forth:
   sintering a mixture including, as major components, a powder of $\beta$-type silicon carbide and a powder of $\alpha$-type silicon nitride at one atmosphere pressure of nitrogen and at a first sintering temperature; and
   resintering the sintered mixture at a pressure of nitrogen gas ranging from 10 to 2000 atmosphere and at a second sintering temperature 100° to 200° C. higher than said first sintering temperature.

2. A method for producing a sintered silicon carbide and silicon nitride composite, comprising the following steps in the sequence set forth:
   compacting a mixture including, as major components, powder of $\beta$-type silicon carbide and powder of $\alpha$-type silicon nitride to form a compact;
   sintering the compact at one atmosphere pressure and at a first sintering temperature to form a sintered compact;
   resintering the sintered compact at a pressure of nitrogen gas ranging from 10 to 2000 atmosphere and at a second sintering temperature 100° to 200° C. higher than said first sintering temperature.

3. A method as claimed in claim 2, wherein said second sintering temperature is about 1750° C.

4. A method as claimed in claim 2, wherein said second sintering temperature is within a range from about 1850° to about 1950° C.

5. A method as claimed in claim 2, wherein said sintering is carried out in an atmosphere of nitrogen gas at a pressure of 1 atmosphere.

6. A method for producing a sintered silicon carbide and silicon nitride composite, comprising the following steps in the sequence set forth:
   sintering a mixture including, as major components, a powder of $\beta$-type silicon carbide having an average particle size ranging from 0.2 to 0.5 $\mu$m, and a powder of $\alpha$-type silicon nitride at one atmospheric pressure and at a first sintering temperature; and
   resintering the sintered mixture at a pressure of nitrogen gas ranging from 10 to 2000 atmosphere and at a second sintering temperature 100° to 200° C. higher than said first sintering temperature.

7. The process of claim 6 wherein the silicon carbide has an average particle size of 0.3 $\mu$m.

8. The process of claim 7 wherein said first sintering temperature is about 1750° C.

* * * * *